(12) United States Patent
Longmeyer (10) Patent No.: US 11,851,114 B1
(45) Date of Patent: Dec. 26, 2023

(54) STAND-ON TRACTOR

(71) Applicant: Stephen E. Longmeyer, Pleasant Hill, MO (US)

(72) Inventor: Stephen E. Longmeyer, Pleasant Hill, MO (US)

(*) Notice: Subject to any disclaimer, the term of this patent is extended or adjusted under 35 U.S.C. 154(b) by 556 days.

(21) Appl. No.: 17/039,280

(22) Filed: Sep. 30, 2020

(51) Int. Cl.
| | | |
|---|---|---|
| *B62D 51/02* | (2006.01) | |
| *B62D 49/06* | (2006.01) | |
| *F16C 23/08* | (2006.01) | |
| *B62D 61/12* | (2006.01) | |
| *A01D 42/00* | (2006.01) | |
| *B62D 51/00* | (2006.01) | |

(52) U.S. Cl.
CPC .............. *B62D 49/06* (2013.01); *A01D 42/00* (2013.01); *B62D 51/001* (2013.01); *B62D 51/02* (2013.01); *B62D 61/12* (2013.01); *F16C 23/086* (2013.01)

(58) Field of Classification Search
CPC ...... B62D 49/06; B62D 51/001; B62D 51/02; B62D 61/12; A01D 42/00; F16C 23/086
See application file for complete search history.

(56) References Cited

U.S. PATENT DOCUMENTS

| | | | | |
|---|---|---|---|---|
| 4,878,339 A | * | 11/1989 | Marier | A01D 34/64 180/209 |
| 5,575,140 A | * | 11/1996 | Bermes | A01D 34/001 56/2 |
| 5,697,623 A | * | 12/1997 | Bermes | A01D 34/001 56/2 |
| 5,882,020 A | | 3/1999 | Welke | |
| 5,909,887 A | * | 6/1999 | Hobrath | A01D 34/001 280/760 |
| 5,947,505 A | * | 9/1999 | Martin | A01D 34/82 280/493 |
| 6,000,705 A | * | 12/1999 | Velke | B60D 1/143 280/32.7 |
| 6,145,855 A | * | 11/2000 | Bellis, Jr. | B62D 49/065 280/492 |
| 6,375,201 B2 | | 4/2002 | Havener | |
| 6,488,291 B1 | * | 12/2002 | Bellis, Jr. | B62D 63/065 280/492 |
| 6,497,422 B1 | * | 12/2002 | Bellis, Jr. | B62D 63/065 280/492 |
| 6,637,760 B1 | * | 10/2003 | Carman | B60D 1/01 280/493 |
| 6,688,090 B2 | * | 2/2004 | Velke | A01D 34/69 56/14.7 |

(Continued)

FOREIGN PATENT DOCUMENTS

| | | | | |
|---|---|---|---|---|
| WO | WO-2013016196 A1 | * | 1/2013 | ........... A01D 34/001 |
| WO | WO-2018031652 A1 | * | 2/2018 | ........... A01D 34/001 |

*Primary Examiner* — Jacob B Meyer
(74) *Attorney, Agent, or Firm* — AVEK IP, LLC (57) ABSTRACT

A tractor includes a tractor frame having a forward end and a rearward end. A control unit is positioned between the forward and rearward ends. A front wheel is relatively near the tractor frame forward end, and a rear wheel is relatively distant from the frame forward end. A work function extends forward of the tractor frame forward end. A platform is rotatably secured to the tractor frame and a rear end of the platform rests atop a biasing member positioned at the tractor frame rearward end. The platform has an axis of rotation higher than an axis of the rear wheel and at least as high as an axis of the front wheel.

22 Claims, 14 Drawing Sheets

(56) References Cited

U.S. PATENT DOCUMENTS

| | | |
|---|---|---|
| 7,467,677 B2 | 12/2008 | Barrier |
| 7,712,751 B2 | 5/2010 | Beal |
| 7,743,840 B2 | 6/2010 | Hoffman |
| 8,141,886 B1* | 3/2012 | Sugden ................ A01D 34/82 56/14.7 |
| 8,448,957 B1* | 5/2013 | Houston ............... A01D 34/82 280/498 |
| 8,454,032 B2* | 6/2013 | Havener ............... B62D 51/02 280/492 |
| 9,409,589 B2* | 8/2016 | Oswald ............... A01D 34/001 |
| 10,472,783 B2 | 11/2019 | Rich |
| 10,858,051 B2* | 12/2020 | Redinger ................ B60R 3/02 |
| 11,178,812 B1* | 11/2021 | Crowl .................. A01D 34/64 |
| 11,178,815 B1* | 11/2021 | Crowl .................... F16H 7/02 |
| 11,712,001 B2* | 8/2023 | Zeiler ................ A01D 34/82 56/17.5 |
| 2002/0171212 A1* | 11/2002 | Bricko ................ B62D 51/02 280/32.7 |
| 2004/0031629 A1* | 2/2004 | Walker ................ B62D 51/04 180/6.48 |
| 2004/0145134 A1* | 7/2004 | Bares ..................... E02F 9/166 280/32.7 |
| 2004/0221561 A1* | 11/2004 | Koehn .................. A01D 34/74 56/15.9 |
| 2005/0183409 A1* | 8/2005 | Barrier ................ A01D 69/03 56/11.9 |
| 2006/0290080 A1* | 12/2006 | Vachal ................ B62D 51/008 280/32.7 |
| 2007/0039304 A1* | 2/2007 | Wright ................ A01D 34/685 56/14.9 |
| 2007/0044446 A1* | 3/2007 | Wright ................... A01D 69/03 56/11.9 |
| 2007/0132204 A1* | 6/2007 | Sewell ................ A01B 51/026 280/418 |
| 2008/0141640 A1* | 6/2008 | Wehler ................... A01D 34/74 56/14.9 |
| 2009/0096178 A1* | 4/2009 | Beal ....................... B62D 53/00 280/32.7 |
| 2009/0302562 A1* | 12/2009 | Kallevig ............... A01D 34/64 280/32.7 |
| 2012/0000172 A1* | 1/2012 | Papke ................... A01D 34/82 56/14.7 |
| 2013/0074467 A1* | 3/2013 | Zwieg ................... A01D 34/74 56/229 |
| 2015/0007542 A1* | 1/2015 | Oswald ................ A01D 34/006 180/6.66 |
| 2017/0150677 A1* | 6/2017 | Hoppel ................ A01D 34/64 |
| 2017/0150681 A1* | 6/2017 | Hoppel ................ A01B 59/064 |
| 2017/0150682 A1* | 6/2017 | Hoppel ................ A01D 42/08 |
| 2018/0132418 A1* | 5/2018 | Bartel ................ A01D 34/824 |
| 2019/0059214 A1* | 2/2019 | Bagwan ................ A01D 34/81 |
| 2019/0133039 A1* | 5/2019 | Bryant ................... A01D 34/64 |
| 2020/0221634 A1* | 7/2020 | Nicholson ............ A01D 34/46 |
| 2020/0352098 A1* | 11/2020 | Fujii ..................... A01D 34/82 |

* cited by examiner

STAND-ON TRACTOR

FIELD OF INVENTION

The invention relates generally to tractors. More specifically, the invention is related to a stand-on tractor with a work function that is rotatable between a use position and a service position.

BACKGROUND

Stand-on tractors are well known in the industry. The benefits of stand on tractors are several, and may include increased safety due to the improved visibility from the standing position of the operator, increased efficiency due to the operator's ability to quickly and easily step on and off of the tractor, and the tractor's relatively small profile which may allow the tractor to operate in tight spaces and be easily stored.

Stand-on tractors also suffer from several flaws. For example, stand-on tractors are generally less stable than riding or walk-behind machines and can therefore be more dangerous to operate. Additionally, because the tractors tend to be smaller, there is little room to carry additional tools, features, or aftermarket accessories. Further development of stand-on tractors is therefore desirable in order to address these and other issues with current technologies.

SUMMARY

The following presents a simplified summary of the invention in order to provide a basic understanding of some aspects thereof. This summary is not an extensive overview of the disclosure. It is not intended to identify critical elements of the invention or to delineate the scope of the invention. Its sole purpose is to present some concepts of the invention in a simplified form as a prelude to the more detailed description that is presented elsewhere herein.

According to one embodiment, a tractor includes a tractor frame having a forward end and a rearward end. A control unit is positioned between the forward and rearward ends. A front wheel is relatively near the tractor frame forward end, and a rear wheel is relatively distant from the frame forward end. A work function extends forward of the tractor frame forward end. A forward end of a platform is rotatably secured to the tractor frame. A rear end of the platform rests atop a biasing member positioned at the tractor frame rearward end. The platform has an axis of rotation higher than an axis of the rear wheel.

According to another embodiment, a stand-on tractor includes a tractor frame having a forward end and a rearward end. An operator control unit is positioned to be accessible from a standing position, and a front wheel is relatively near the tractor frame forward end. A rear wheel support frame is rotatably coupled to the tractor frame via a bearing coupler along an axis generally parallel to a longitudinal axis of the tractor frame, and the rear wheel support frame includes at least one support arm and a rear wheel coupled to the at least one support arm. A work function is forward of the tractor frame forward end, and the work function is at least partially supported by an auxiliary wheel. A platform is coupled to the tractor frame for supporting an operator in the standing position.

According to still another embodiment, a stand-on tractor includes a tractor frame having a standing area for supporting an operator in a standing position. An operator control unit is positioned to be accessible from the standing position. The tractor frame has a forward end and a rearward end, a front wheel is relatively near the tractor frame forward end, and a rear wheel is relatively distant from the frame forward end. A work function extends from and is rotatably coupled to the tractor frame forward end. The work function is rotatable between a use position relatively near a ground surface and a service position generally perpendicular to the ground surface. An axis of rotation of the work function relative to the tractor frame is substantially vertically aligned with a centerline of an operable portion of the work function when the work function is in the use position.

DETAILED DESCRIPTION

FIGS. 1-13 illustrate a stand-on tractor 100 according to some embodiments of the invention. The tractor 100 broadly includes a frame 110, front wheels 112, rear wheels 114, an engine 138, a work function 140 that may have a removable cartridge 145, a platform 160, and a control system 170.

The frame 110 has a front end 110a and a rear end 110b, and the front wheels 112 and the rear wheels 114 allow the frame 110 to be easily transported. The frame 110 provides support for the engine 138, the work function 140, the platform 160, and the control system 170.

Figure 10:
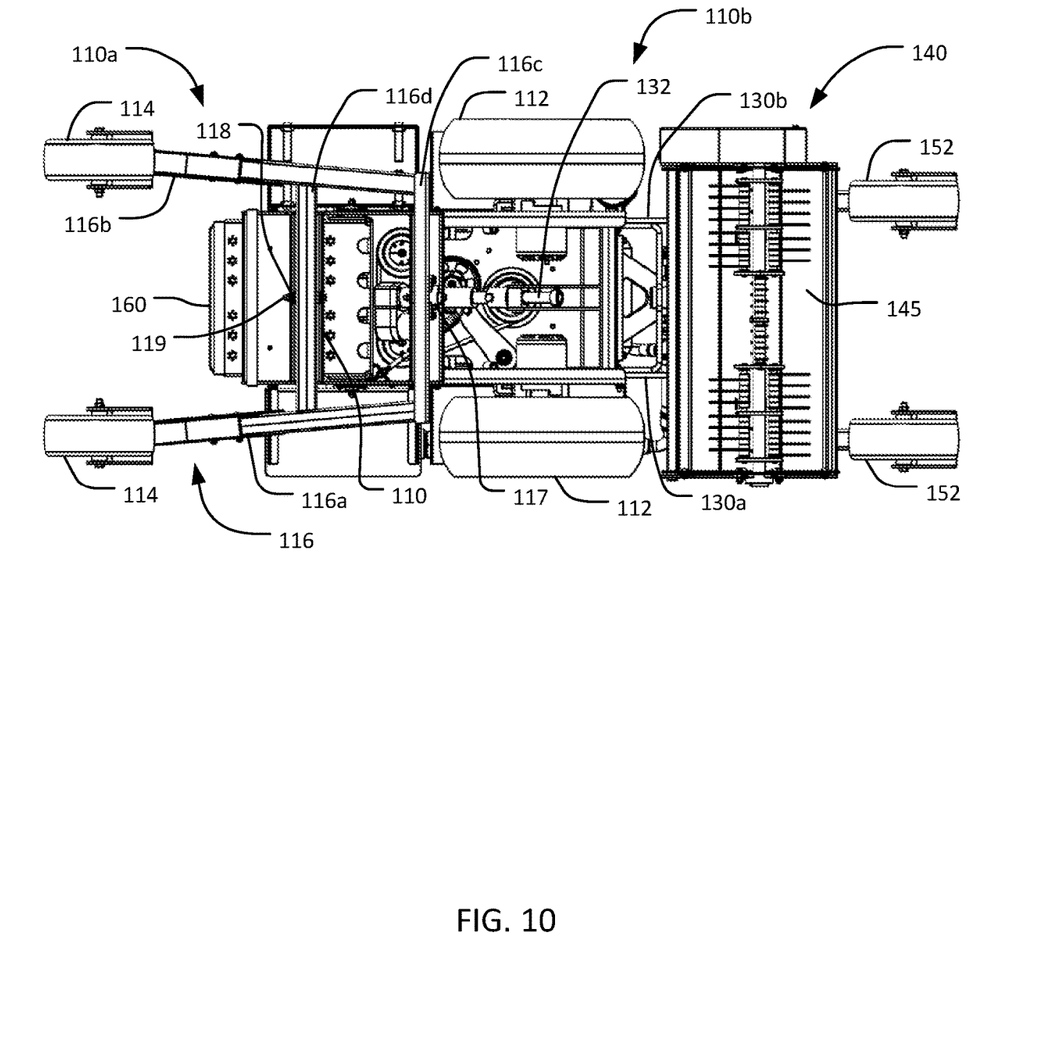
FIG. 10 is a bottom view of the tractor of FIG. 1.
Figure 11:
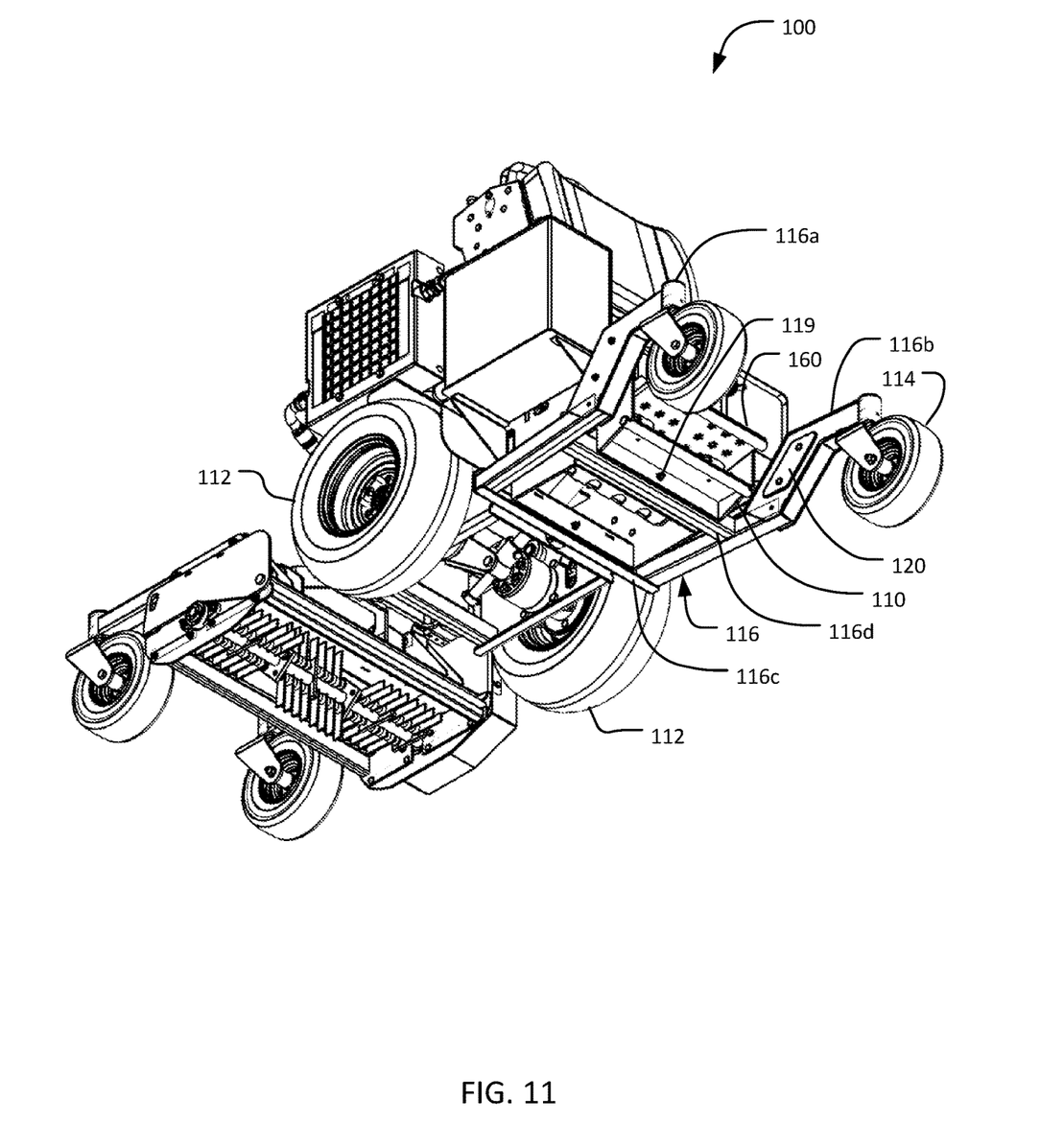
FIG. 11 is a bottom perspective view of the tractor of FIG. 1.
Figure 12:
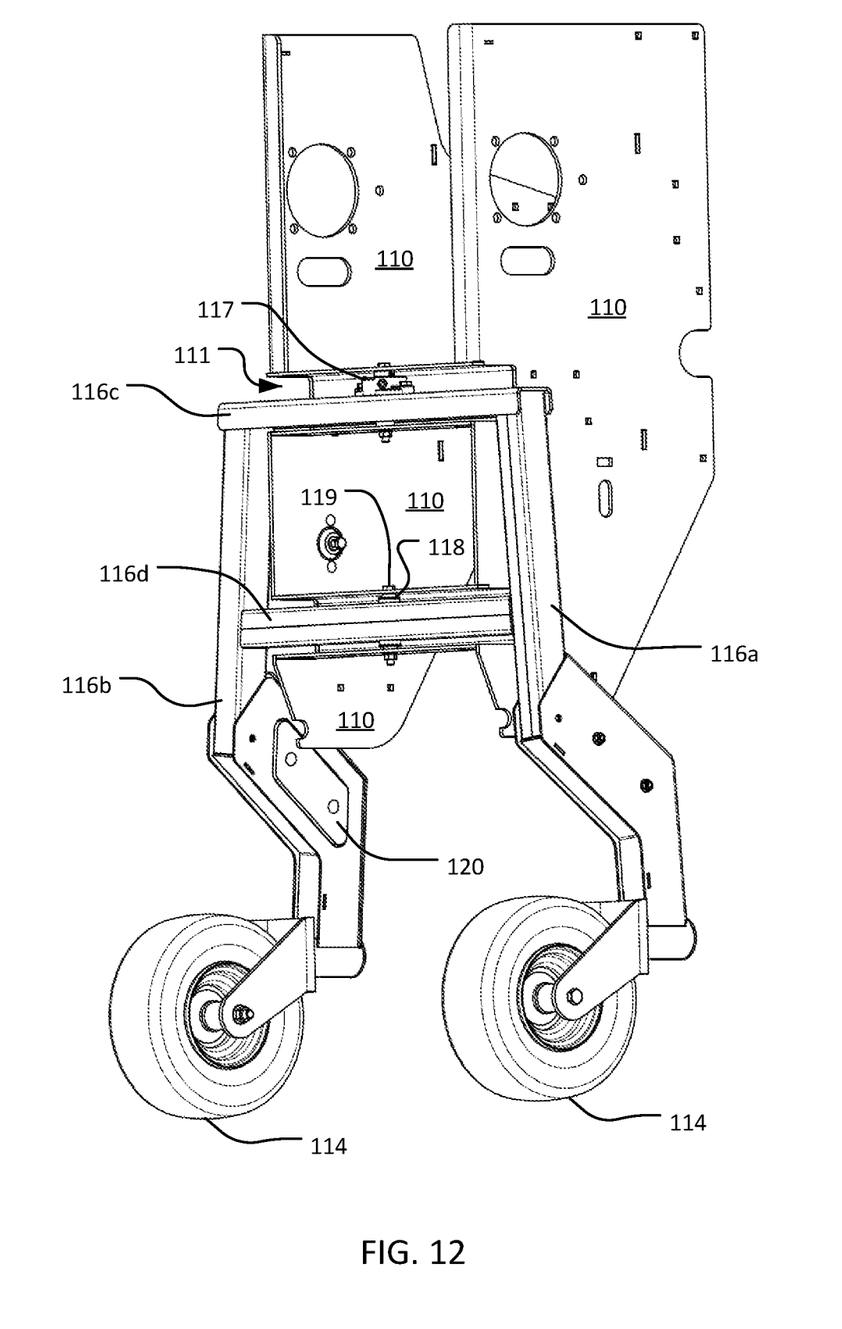
FIG. 12 is a close-up bottom perspective view of the rear wheel frame of the tractor of FIG. 1.
Figure 13:
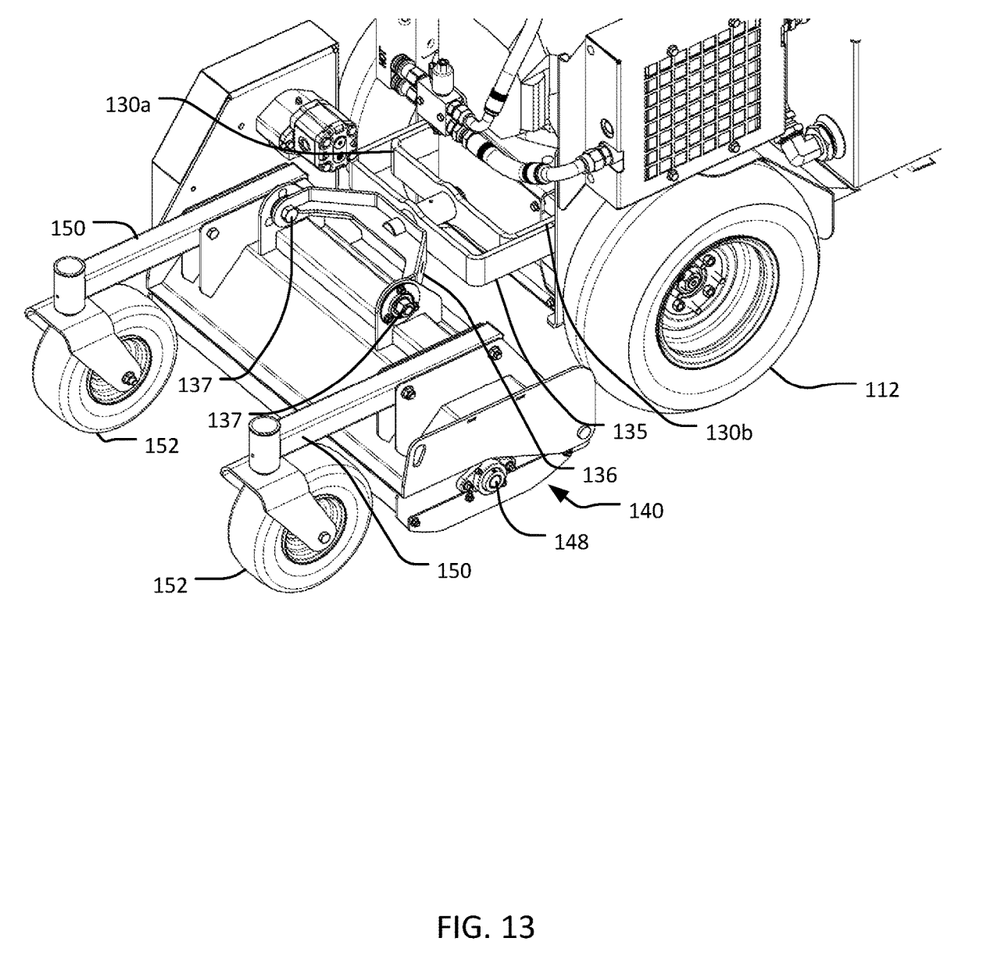
FIG. 13 is a close-up front perspective view of the work function of the tractor of FIG. 1.

Beginning at the rear end 110b of the tractor 100, the rear wheels 114 are coupled to the rear end 110b of the frame 110 by a rear wheel frame 116 which is best illustrated in FIGS. 10-12. The rear wheel frame 116 includes a left support arm 116a and a right support arm 116b. The respective support arms 116a, 116b are joined by a forward crossmember 116c. A further rearward crossmember 116d may further stabilize the support arms 116a and 116b.

The forward cross member 116c is operatively coupled to the frame 110 via a forward bearing coupler 117 which allows the rear wheel frame 116 to rotate relative to the frame 110. More particularly, the rear wheel frame 116, via the bearing coupler 117, is permitted to rotate in a clockwise and counterclockwise direction relative to the ground. In some embodiments, the rear wheel frame 116 may be permitted to additionally or alternatively tilt up and down via the bearing coupler 117. In some embodiments, the bearing coupler 117 is a pillow block bearing. However, the bearing coupler 117 may be any appropriate coupler that is now known or later developed (e.g., a ball and socket joint, a universal joint, et cetera).

An aperture may be formed in the rearward crossmember 116d for receiving a rearward bearing 118. Corresponding apertures in the frame 110 allow a shaft 119 (FIG. 12) to extend through the frame 110 and the bearing 118 to pivotably mount the rearward crossmember 116d to the frame 110. The rearward crossmember 116d, via the bearing 118, may rotate about the shaft 119 in a clockwise and counterclockwise direction relative to the ground. The forward bearing coupler 117 is aligned with rearward bearing 118 to support the rear wheel frame 116 and allow for rotation as described above.

The crossmembers 116c, 116d extend outwardly from a center of the rear wheel frame 116 through openings 111 formed the frame 110. The openings 111 provide a stopping mechanism to prevent over-rotation of the rear wheel frame 116.

The respective supports arms 116a, 116b and the respective crossmembers 116c, 116d may be integrally formed or joined (e.g., welded) to form a single pivotable structure. However, in some embodiments, the left and right support arms 116a, 116b may be independently moveable, and in such a case, the respective crossmembers 116c, 116d may be modified to provide the necessary support to the support arms 116a, 116b while also movably attaching the support arms 116a, 116b to the frame 110.

A cavity in each of the support arms 116a and 116b may receive ballast 120 to adjust the center of gravity to stabilize the rear end 110b of the tractor 100. The ballast may be, for example, stacked weights. Weights may be added and/or removed to each of the support arms 116a, 116b as necessary to provide stabilization. Additional or alternative ballast may be situated between the front end 110a and the rear end 110b of the tractor 100. The additional or alternative ballast may, for example, include a hydraulic fluid reservoir and/or a gasoline tank. The hydraulic fluid reservoir may support actuation of the work function 140 as is described in greater detail below.

The rear wheels 114 may be any appropriate wheel. In some embodiments, it may be desirable for the rear wheels 114 to be passive casters. In other words, the rear wheels 114 may not be controlled via the control system 170; rather, the rear wheels 114 may simply follow the forward wheels 112 which are active and controlled by the user via the control system 170. In some embodiments, it may be preferable for a diameter of each of the rear wheels 114 to be not more than sixty percent of a diameter of the forward wheels 112.

Figure 9A:
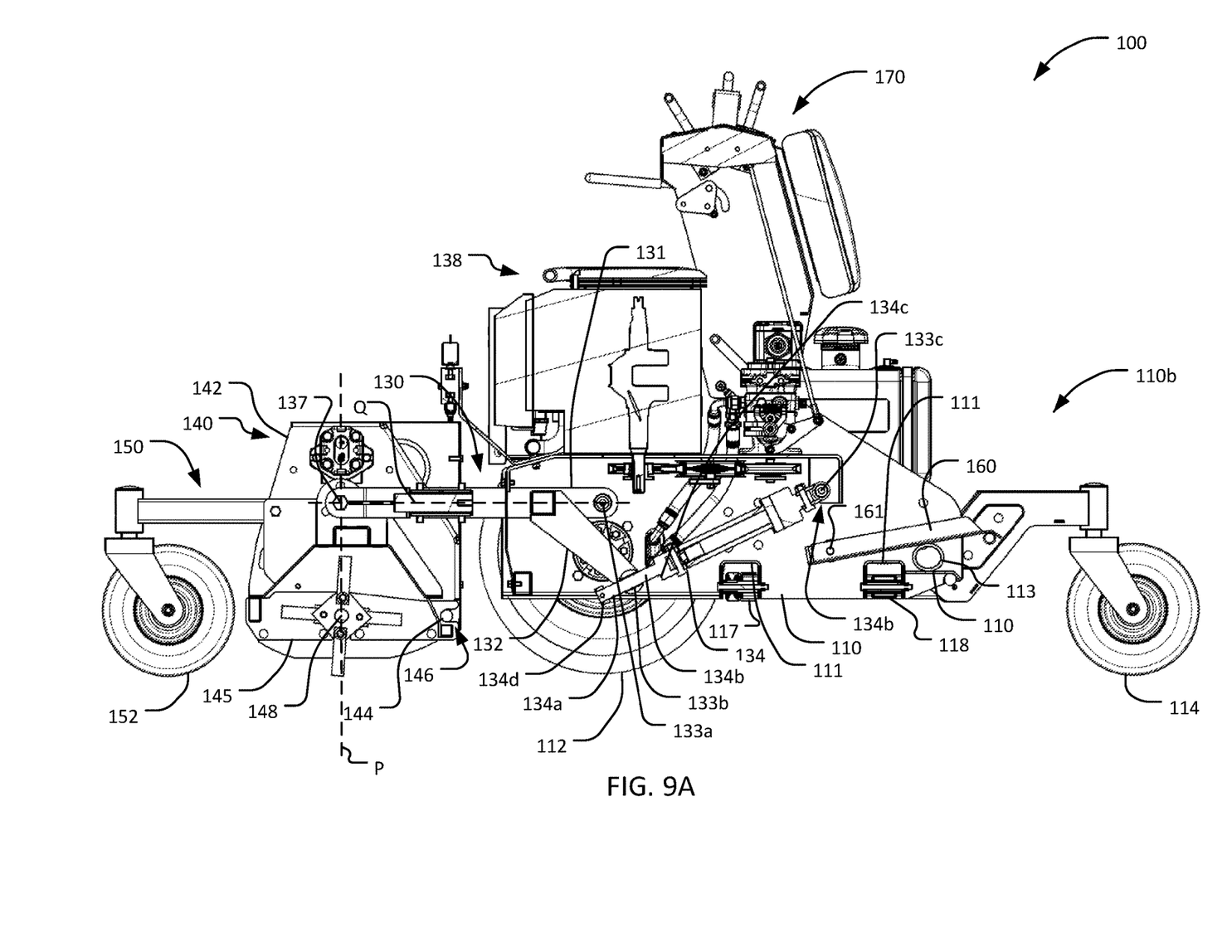
FIG. 9A is a section view of the tractor of FIG. 1, taken along a longitudinal axis, shown at a use configuration.
Figure 9B:
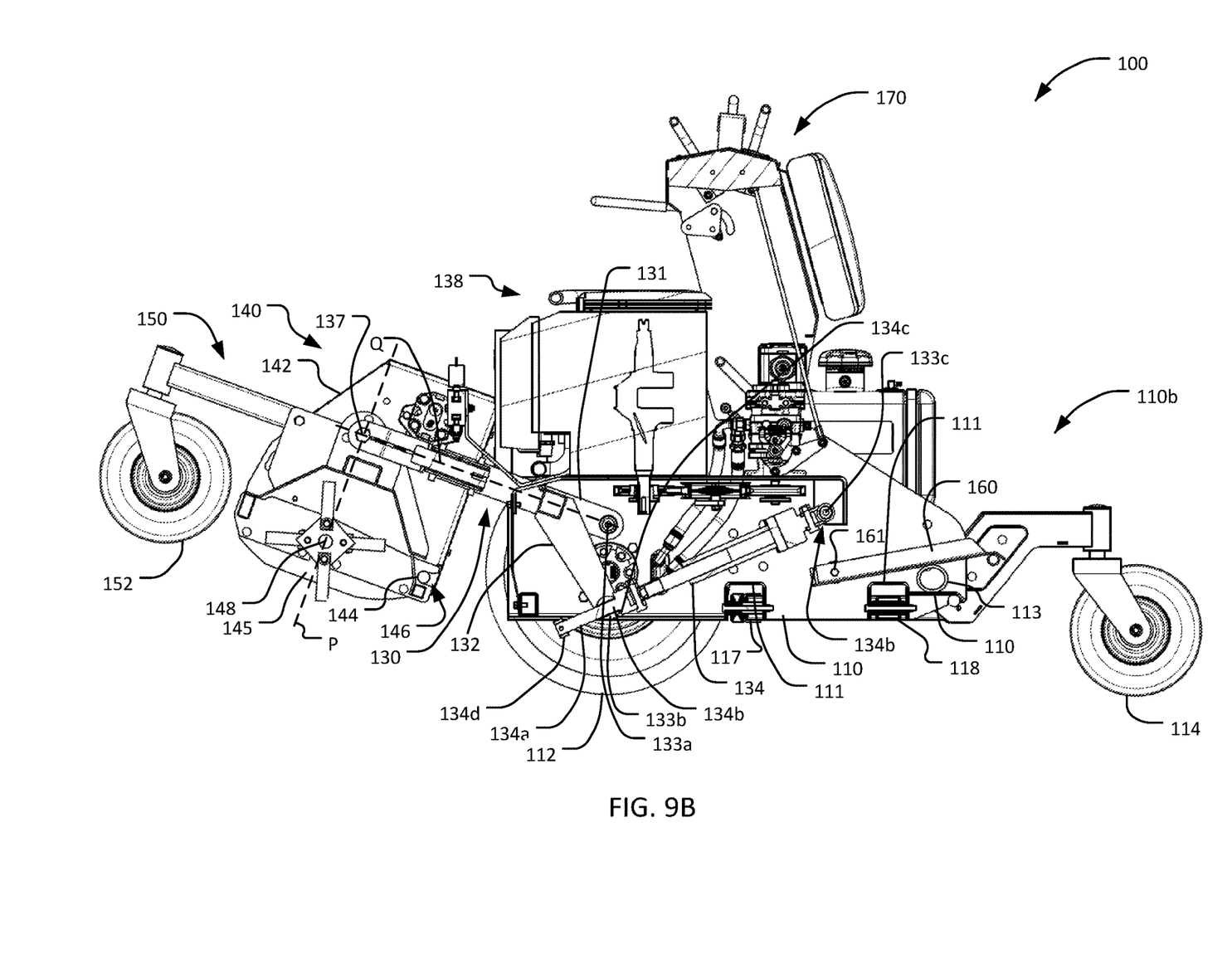
FIG. 9B is a section view of the tractor of FIG. 1, taken along a longitudinal axis, shown at a withdrawn configuration.

Referring now to FIGS. 3, 9A-9B, and 11, the frame 110 provides support for the standing platform 160 which is located at the rear end 110b of the frame 110. Opposing sides of a forward end of the platform 160 attach to the frame 110 via fasteners 161. The center of each fastener 161 is generally horizontally aligned with the axis of rotation of the forward wheels 112 such that the platform 160 is generally positioned at an elevation above a majority of the rear wheel frame 116 (and specifically at an elevation entirely above the crossmembers 116c, 116d) and substantially above the axis of rotation of the rear wheels 114. A rear end of the platform 160 may be unattached to the frame 110 and thus allowed to pivot about the fasteners 161. The axis of rotation about the fasteners 161 may be generally perpendicular, and askew, to the axis of rotation about which the rear wheel frame 116 pivots, with both axes extending generally horizontally. As shown in FIG. 9A, one or more biasing members 113 (e.g., springs, fluid-filled bladders, etc.) may be coupled to the frame 110 and the rear end of the platform 160 may rest atop the biasing members 113. The biasing members 113 are flexible to provide a cushioned surface upon which to stand when a user is atop the platform 160.

Moving on, the forward end 110a of the tractor 100 supports the work function 140 which includes a housing 142 and any appropriate mechanism configured to couple to the work function housing 142, such as a rotary spring tine rake, rotary flail rake, rotary verticutter, scarifier, power box rake, a side delivery rake, an overseeder, a broadcast spreader, an aerator, a sod cutter, a blower, a rotary sweeper, a vacuum, a rotary crack cleaner, a rotary mower, a dump cart, a nut rake, a roller, et cetera. As will be described in greater detail below, the work function 140 is configured to rotate upwards into a service position for service or replacement. In various embodiments, a cartridge 145 containing the mechanism may be received in the housing 142 for additional convenience.

At least one auxiliary arm 150 may extend forward of the work function 140 to support an auxiliary wheel 152. In the embodiment shown, a pair of auxiliary arms 150 extends forward of the work function 140 supporting two auxiliary wheels 152. The auxiliary wheels 152 may be any appropriate wheel, though it may be particularly desirable for the auxiliary wheels 152 to be passive casters. In other words, the auxiliary wheels 152 may not be controlled via the control system 170; rather, the auxiliary wheels 152 may be directed by the forward wheels 112 which are controlled via the control system 170. In some embodiments, it may be preferable for a diameter of each of the auxiliary wheels 152 to be not more than sixty percent of the diameter of the forward wheels 112. It may be particularly desirable for the auxiliary wheels 152 to be identically sized to the rear wheels 114, though other sizes may also be used.

The work function 140 is secured to the frame 110 via a forward frame comprising rotatable arms 130a and 130b. Each arm 130a, 130b (generally referred to as arm 130) includes first and second portions 131 and 132 respectively. A distal end of the second portion 132 is rigidly coupled to the first portion 131 near a proximal end of the first portion 131. The proximal end of the first portion 131 of each arm 130 is rotatably secured to the frame 110 at a first point of rotation 133a. A proximal end of the second portion 132 is slidably secured to a distal end 134a of an actuator 134 at a second point of rotation (also called "intersection point") 133b. More particularly, the proximal end of the second portion 132 is movable along section 134b of the actuator 134, with stops 134c, 134d defining opposite ends of the section 134b. The actuator 134 is in turn secured to the frame 110 at a third point of rotation 133c. The actuator 134 may but need not necessarily be a hydraulic actuator; in other embodiments, the actuator 134 may be an electrical actuator or a mechanical actuator. The actuator 134 may be controlled by the user via the control system 170.

In use, the actuator 134 is operable to lift the arms 130 to rotate the work function 140 from a use position to a withdrawn position. When the actuator 134 is at a retracted configuration, the intersection point 133b is roughly midway along the section 134b of the actuator 134 and the work function 140 is at the use position (FIG. 9A). If the work function encounters varying terrain, the intersection point 133b may move along the section 134b and still allow the work function 140 to remain at the use position. To lift the work function 140 into the withdrawn position (FIGS. 2 and 9B), the actuator 134 is protracted, causing the stop 134c to eventually push the intersection point 133b. In turn, the first and second portions 131, 132 of the arm 130 rotate clockwise about the first point of rotation 133a, thus causing the work function 140 to raise into the withdrawn position.

Figure 1:
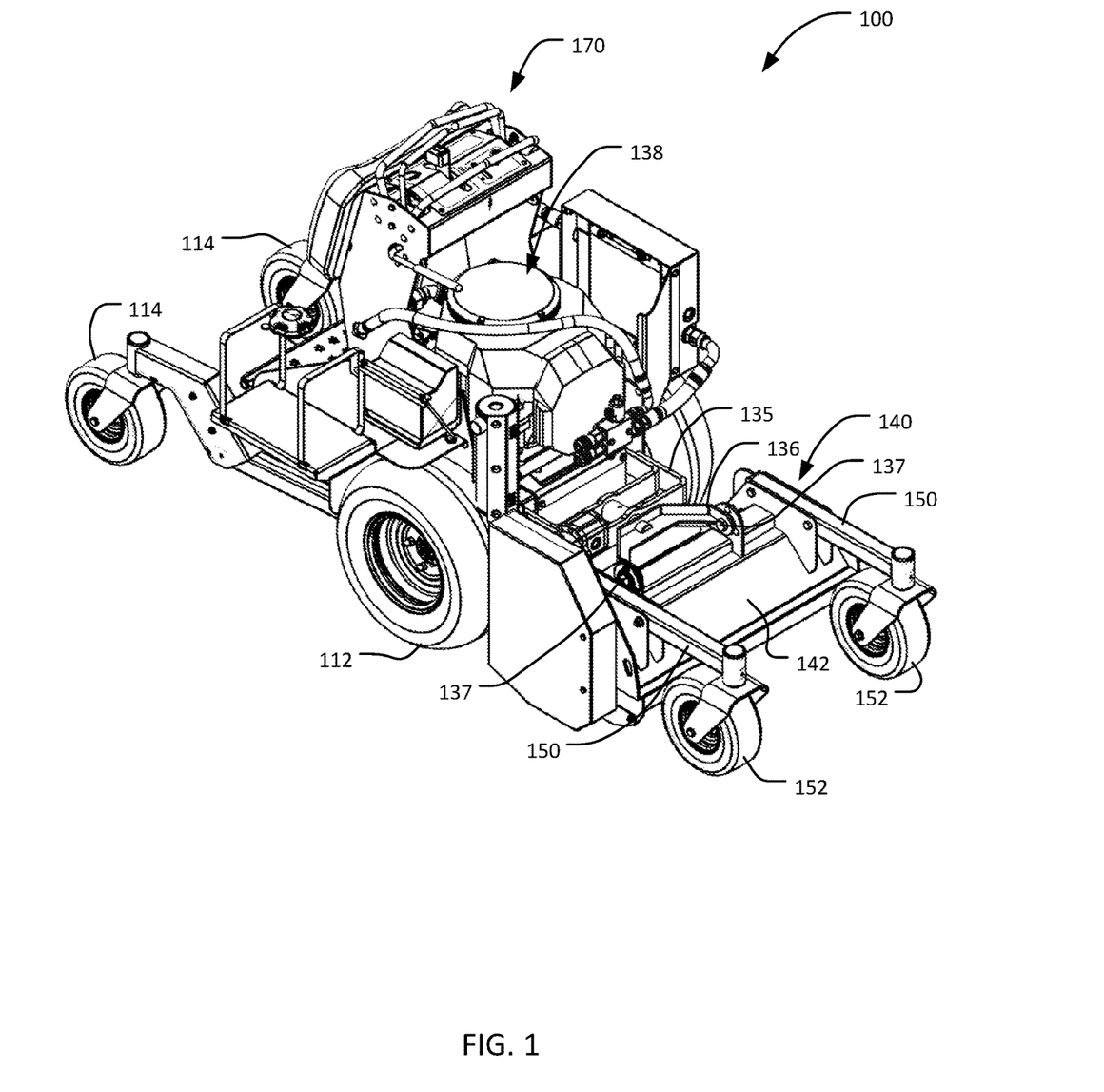
FIG. 1 is a front perspective view of a tractor according to some embodiments of the invention.
Figure 2:
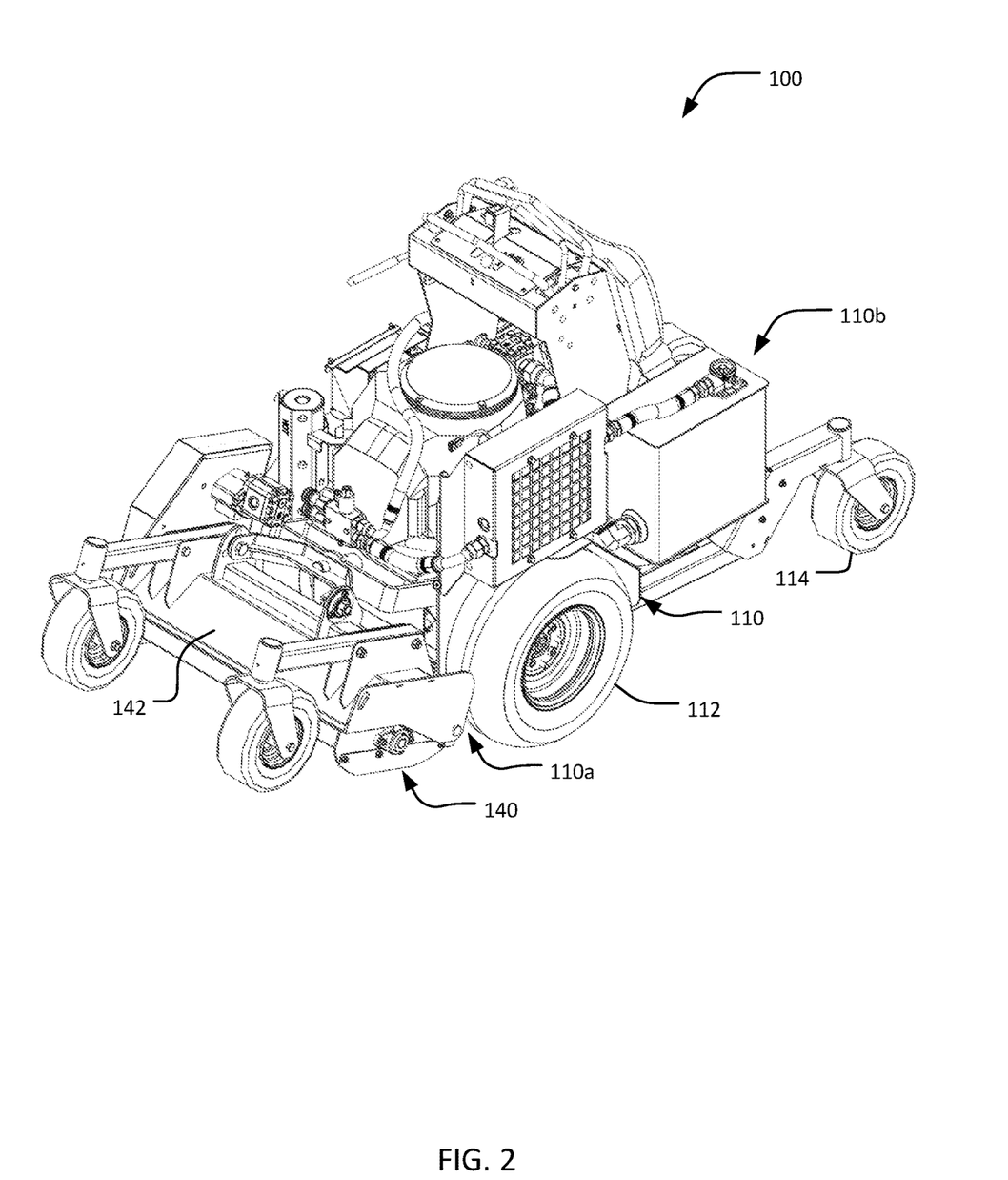
FIG. 2 is another perspective view of the tractor of FIG. 1.
Figure 3:
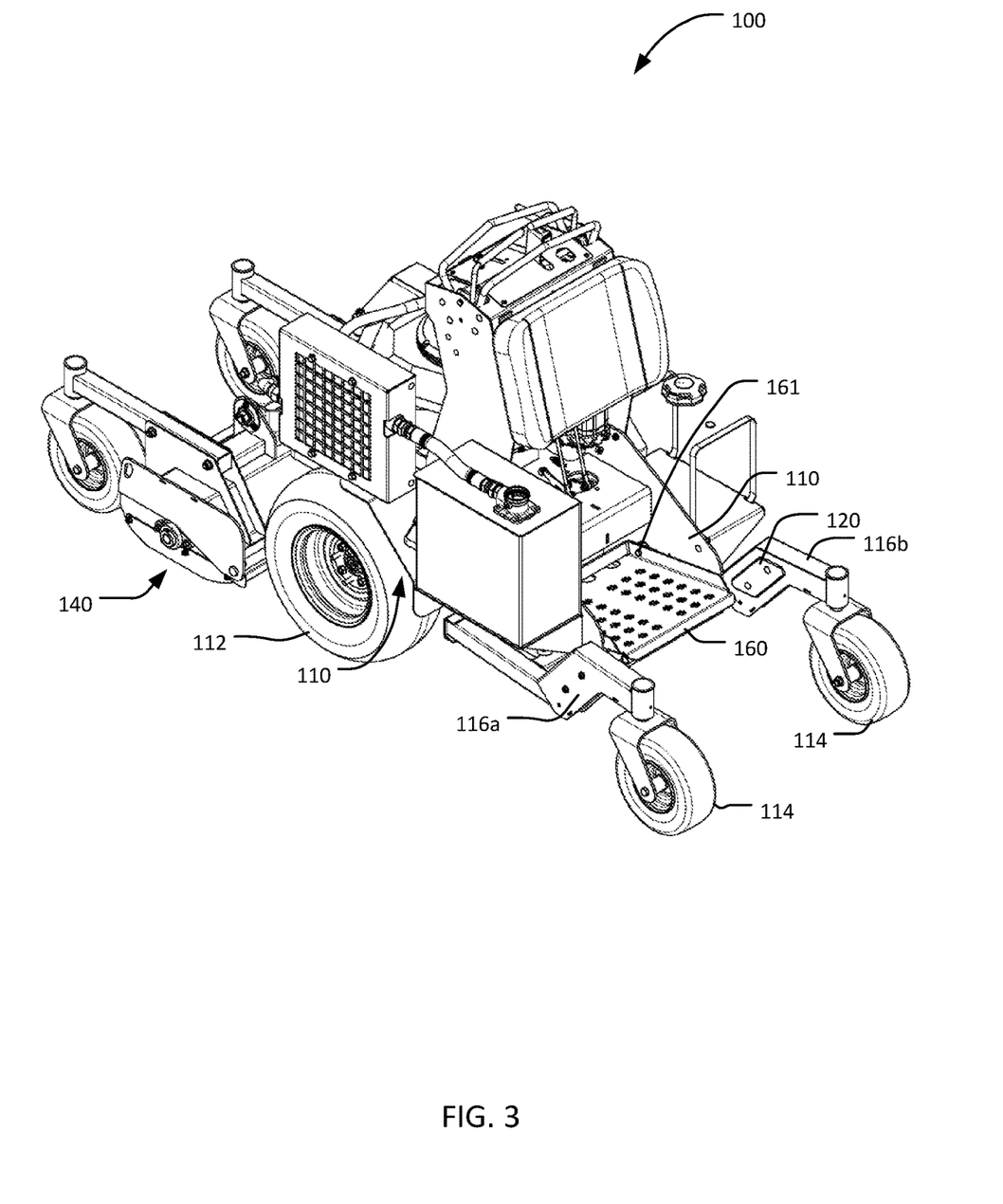
FIG. 3 is a rear perspective view of the tractor of FIG. 1.
Figure 4:
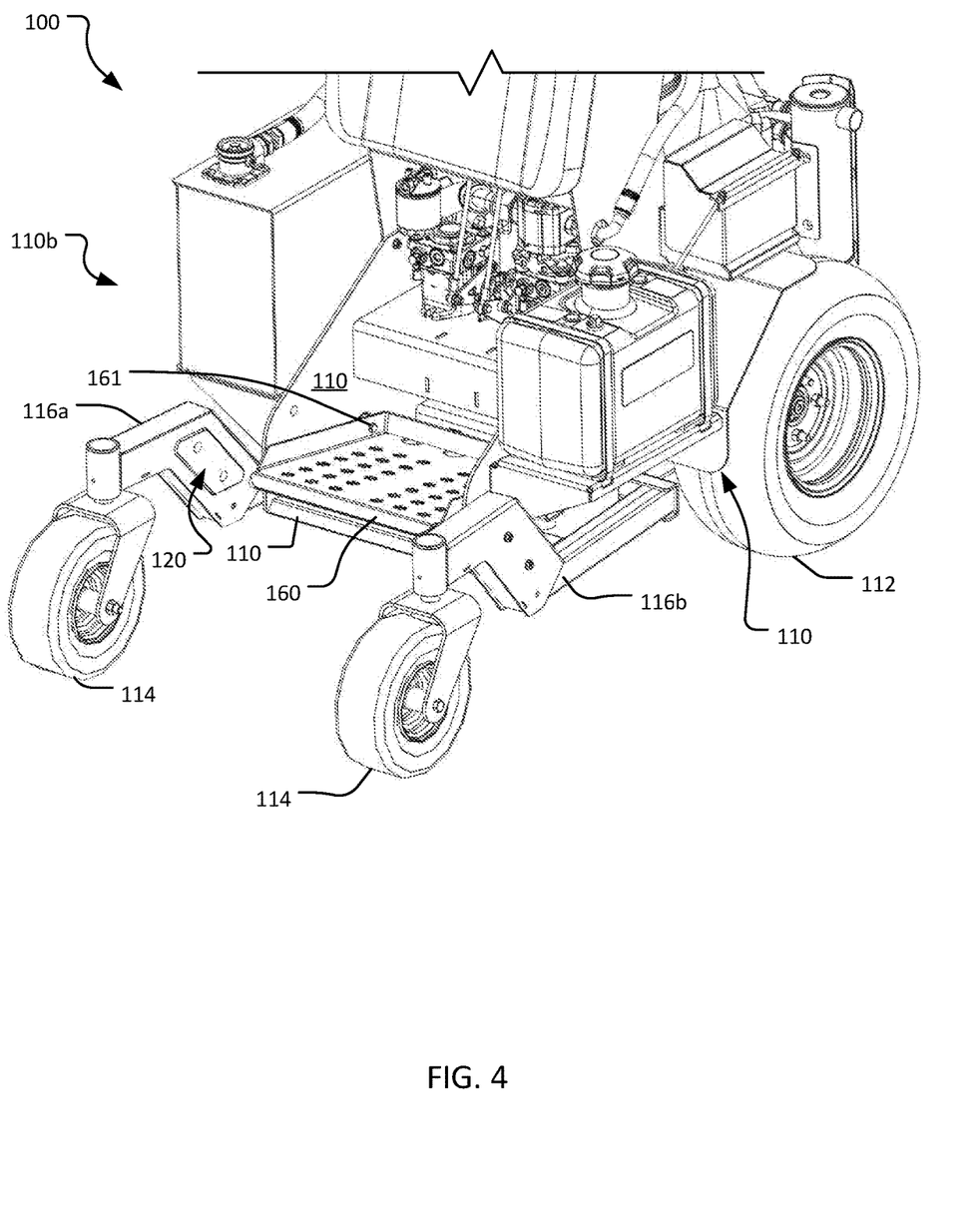
FIG. 4 is a close-up rear perspective view of the tractor of FIG. 1.

The arms 130a, 130b are operably coupled to a forward support 135, and the forward support 135 is in turn operably coupled to a bracket 136 configured to attach to the work function 140. Fasteners 137 secure the work function 140 to the bracket 136. Further, the fasteners 137 define a horizontal axis about which the work function 140 rotates between a use position (FIG. 5) and a servicing position (FIGS. 6-8). The bracket 136 may be generally U-shaped as shown in FIG. 1. However, the bracket 136 need not be U-shaped, and may take any other appropriate shape that allows the bracket 136 to support the work function 140.

Figure 5:
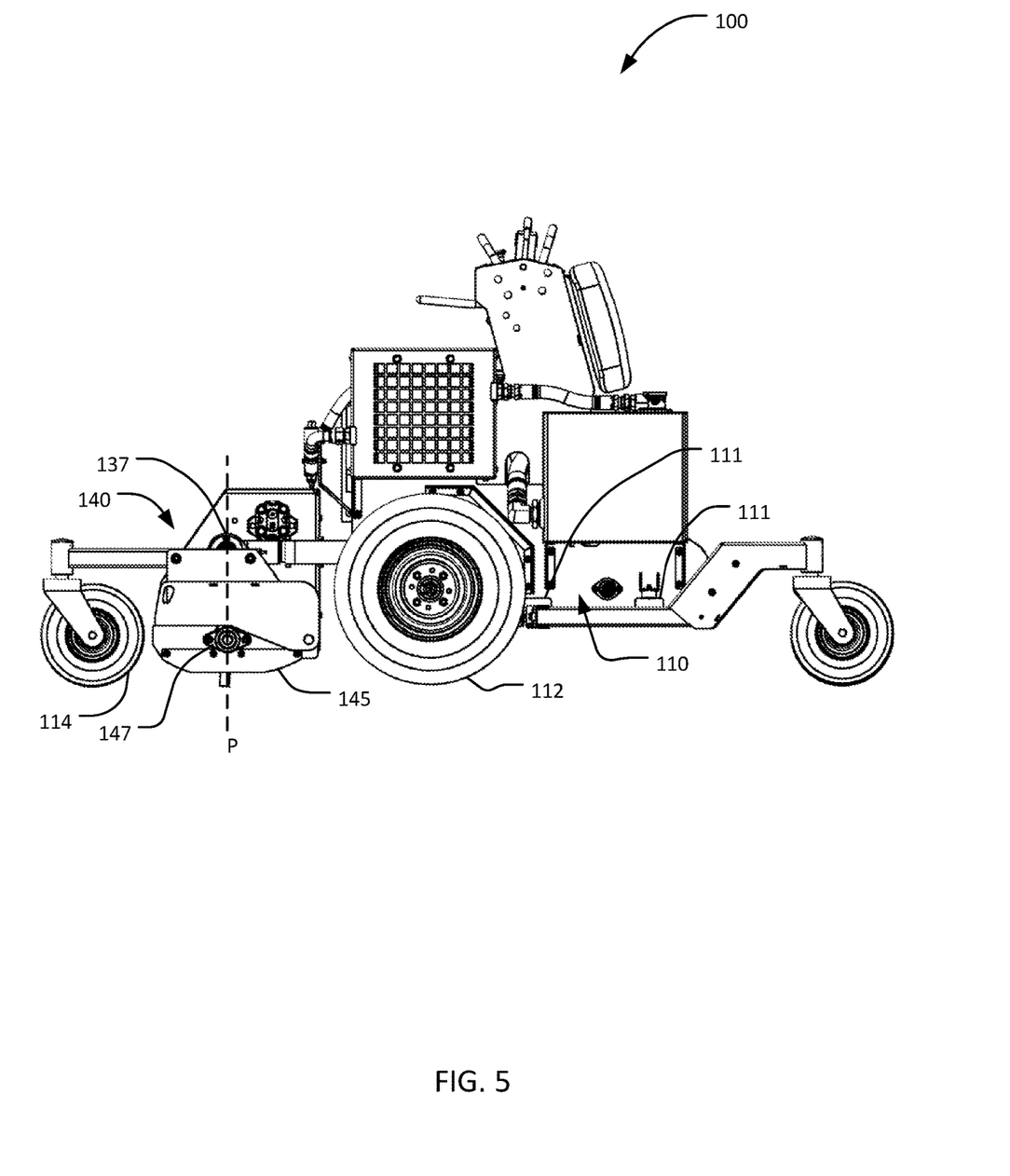
FIG. 5 is a left side view of the tractor of FIG. 1 with the work function in a use position.
Figure 6:
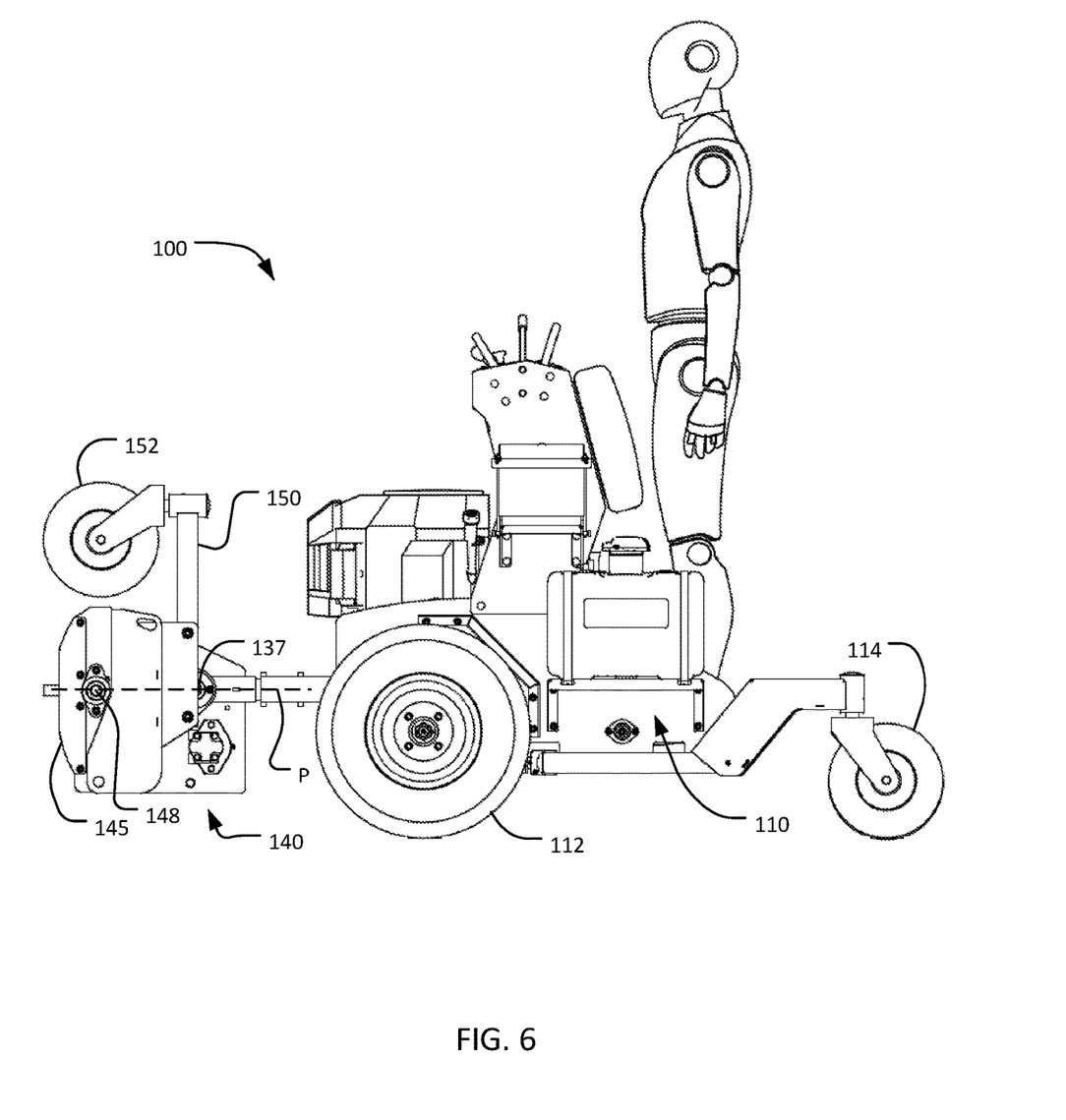
FIG. 6 is a left side view of the tractor of FIG. 1 with the work function in a service position, and shown with an operator.
Figure 7:
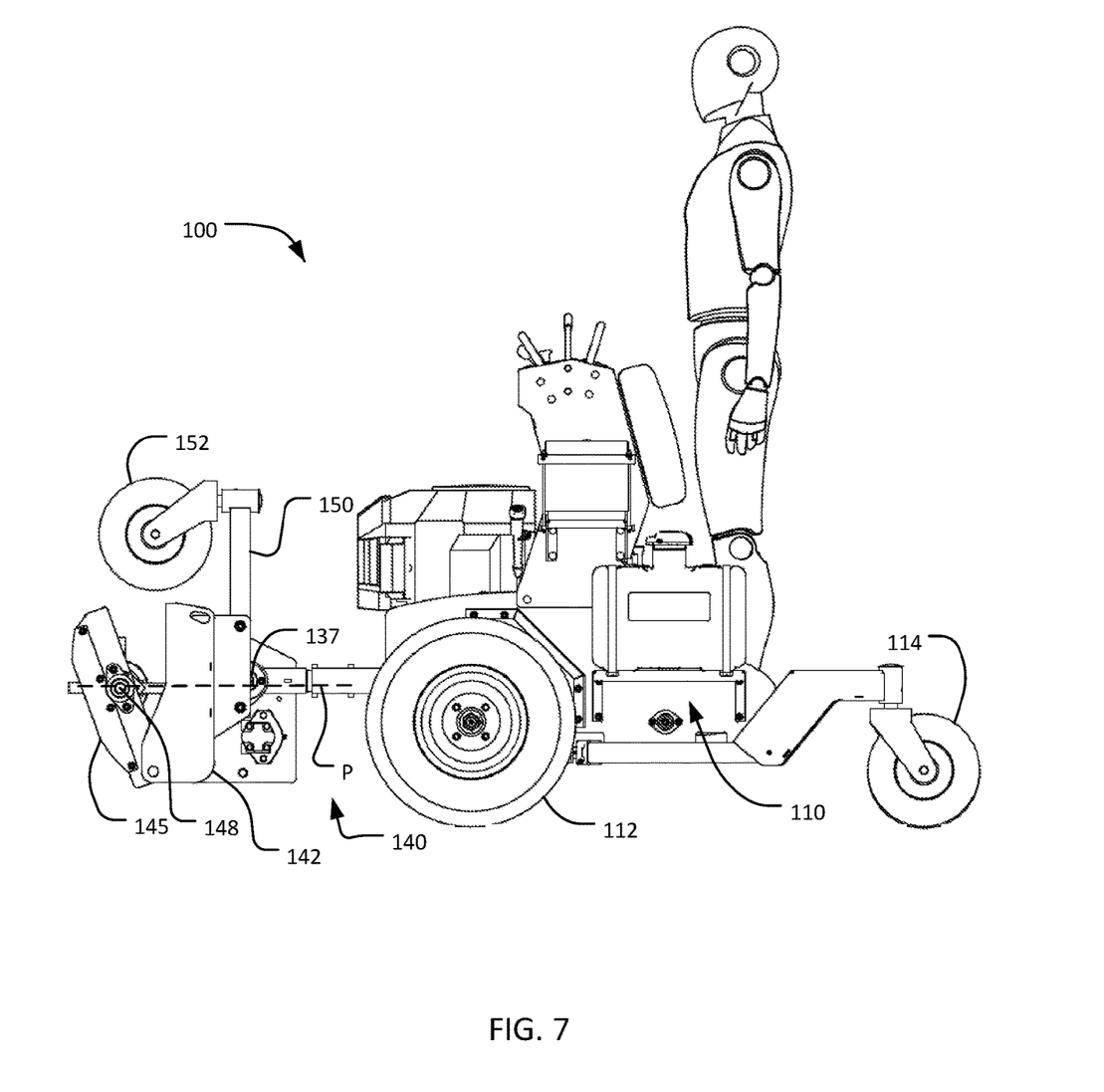
FIG. 7 is a left side view of the tractor of FIG. 1, with a cartridge rotated out of the work function, and shown with an operator.
Figure 8:
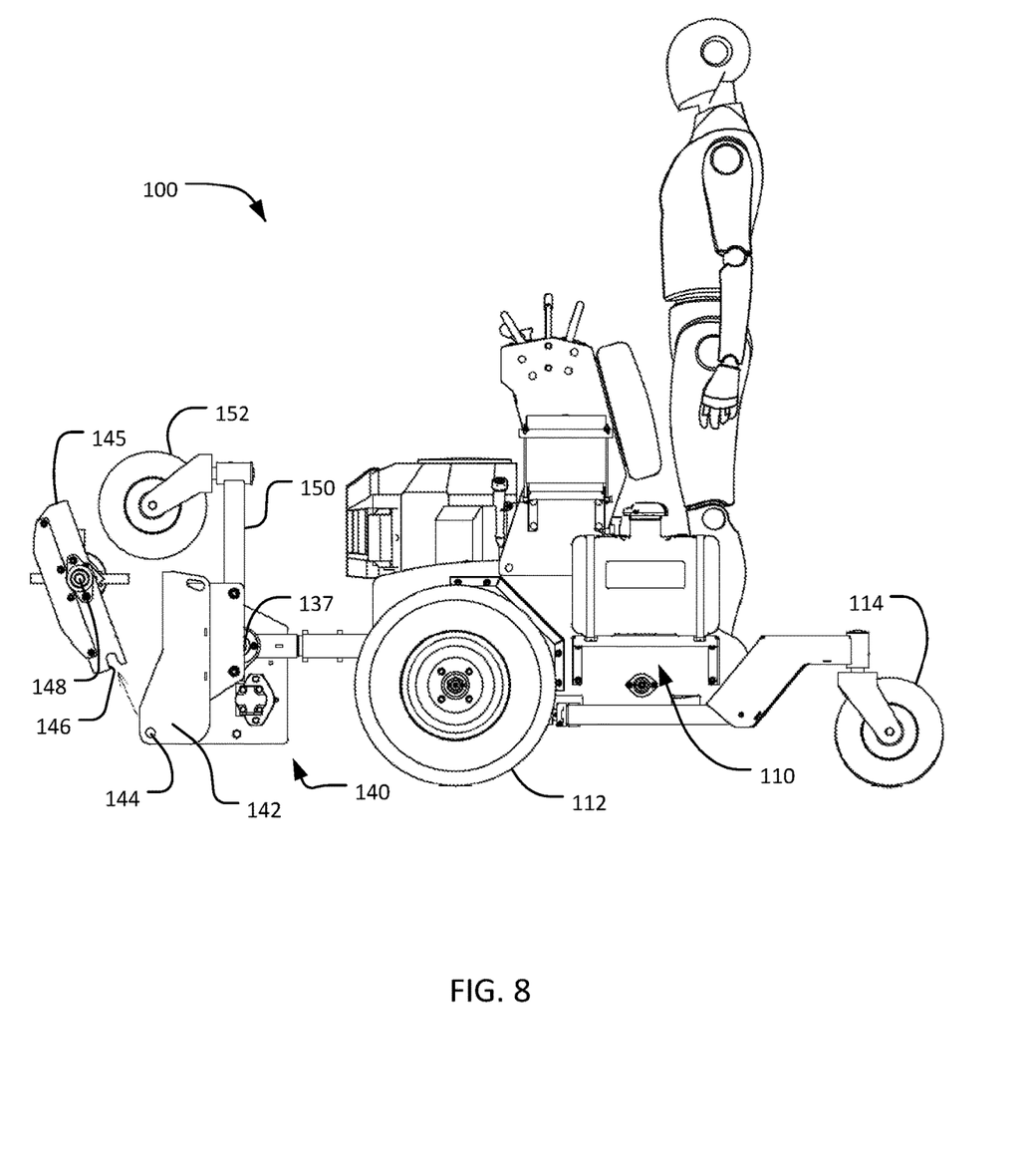
FIG. 8 is a left side view of the tractor of FIG. 1, with the cartridge removed from the work function, and shown with an operator.

Referring specifically now to FIGS. 5-7, rotation of the work function 140 is illustrated. In FIG. 5, the work function 140 is in the use position. Notably, when in the use position, the axis of rotation 137 of the work function 140 is substantially vertically aligned with a centerline 148 of the cartridge 145. In other words, the axis of rotation 137 and the centerline 148 are generally in the same plane P when the work function 140 is in the use position.

In addition to the axis of rotation 137 and the centerline 148 being in the same general plane P, the points of rotation 137 of the work function 140 are generally horizontally aligned with the first points of rotation 133a of the arms 130 along plane Q. This is most clearly illustrated in FIG. 9B.

As mentioned above, the work function 140 includes the housing 142 configured to receive the cartridge 145. More particularly, the housing 142 includes an opening in the underside thereof into which the cartridge 145 is positioned. As shown in FIGS. 7-8, a notch 146 in the cartridge 145 engages with a pin 144 on the housing 142 to align and rotate the cartridge 145 within the housing 142. The cartridge 145 may lock into position with the housing 142 to prevent an unintended disconnect. Further, when the cartridge 145 is secured within the housing 142, the cartridge 145 may be operably coupled to the engine 138 to provide power to the cartridge 145.

The cartridge 145 can be accessed by rotating the work function 140 from the use position to the service position, illustrated in FIG. 6. In the service position, the axis of rotation 137 of the work function 140 is substantially horizontally aligned with the centerline 148 of the cartridge 145. In other words, in the service position as in the use position, the axis of rotation 137 and the centerline 148 are generally in the same plane P. Because the axis of rotation 137 of the work function 140 is generally aligned with the centerline 148 of the cartridge 145, the center of gravity of the work function 140 can be maintained as low as possible even when the work function 140 is in the service position.

With the work function 140 rotated into the servicing position, the cartridge 145 may be removed from the housing 142 by disengaging the notch 146 from the pin 144 and lifting the cartridge 145 from the housing 142 as shown in FIG. 8. A new or serviced cartridge 145 may simply be inserted back into the housing 142, and the work function 140 can be rotated back into the use position.

As will be understood from the foregoing description, the tractor 100 has two regions of rotation that allows for maximum flexibility for using and servicing the tractor 100. The entire work function 140 can be rotated into a withdrawn position via the arms 130, which may allow the tractor 100 to more easily traverse the ground when the work function 140 is not needed. Further, the housing 142 can be rotated into a servicing position about the pins 137 such that the user can access, service, and/or replace the cartridge 145.

Many different arrangements of the various components depicted, as well as components not shown, are possible without departing from the spirit and scope of the invention. Embodiments of the invention have been described with the intent to be illustrative rather than restrictive. Alternative embodiments of the invention will become apparent to those skilled in the art that do not depart from its scope. A skilled artisan may develop alternative means of implementing the aforementioned improvements without departing from the scope of the invention. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A stand-on tractor, comprising:
a tractor frame having a forward end and a rearward end;
an operator control unit positioned between the forward end and the rearward end;
a front wheel relatively near the tractor frame forward end;
a rear wheel relatively distant from the frame forward end;
a work function extending forward of the tractor frame forward end;
a platform extending from the tractor frame for supporting an operator in a standing position, wherein a forward end of the platform is rotatably secured to the tractor frame; and
a biasing member positioned at the tractor frame rearward end, a rear end of the platform resting atop the biasing member;
wherein the platform has an axis of rotation higher than an axis of the rear wheel.

2. The stand-on tractor of claim 1, wherein:
the work function is at least partially supported by an auxiliary wheel; and
at least one of the rear wheel and the auxiliary wheel is a caster.

3. The stand-on tractor of claim 2, wherein a diameter of the caster is not more than sixty percent of a diameter of the front wheel.

4. The stand-on tractor of claim 1, wherein:
the work function is supported by a forward frame pivotally connected to the tractor frame thereby defining a first axis of rotation; and
wherein the forward frame is pivotable from a use position to a withdrawn position.

5. The stand-on tractor of claim 4, wherein:
the forward frame further comprises a bracket, the work function being rotatably coupled to the bracket thereby defining a second axis of rotation; and
wherein the work function is rotatable from a use position to a service position.

6. The stand-on tractor of claim 5, wherein the first axis of rotation and the second axis of rotation are substantially linearly aligned.

7. The stand-on tractor of claim 5, wherein:
the work function comprises a cartridge;

the cartridge comprises a centerline; and the second axis of rotation and the centerline are substantially vertically aligned when the work function is in the use position.

8. The stand-on tractor of claim 1, wherein the work function is selected from the group consisting of a rotary spring tine rake, a rotary flail rake, a rotary verticutter, a side delivery rake, an overseeder, a broadcast spreader, an aerator, a sod cutter, a blower, a rotary sweeper, a vacuum, a rotary crack cleaner, a rotary mower, a dump cart, a nut rake, and a roller.

9. The stand-on tractor of claim 1, further comprising a rear wheel support frame movable relative to the tractor frame, the rear wheel being supported by the rear wheel support frame.

10. The stand-on tractor of claim 9, wherein the rear wheel support frame is rotatably coupled to the tractor frame via a bearing coupler along an axis generally parallel to a longitudinal axis of the tractor frame.

11. The stand-on tractor of claim 10, wherein the bearing coupler is a pillow block bearing.

12. The stand-on tractor of claim 1, wherein the front wheel is independently driven.

13. The stand-on tractor of claim 1, further comprising a rear wheel support frame rotatably coupled to the tractor frame via a bearing coupler along an axis generally parallel to a longitudinal axis of the tractor frame, the rear wheel support frame comprising at least one support arm, the rear wheel being coupled to the at least one support arm.

14. The stand-on tractor of claim 13, wherein:

the rear wheel support frame comprises two support arms; and each support arm comprises a cavity for receiving ballast.

15. The stand-on tractor of claim 14, wherein:

the rear wheel support frame further comprises a crossmember joining the two support arms; and the bearing coupler engages the crossmember to rotatably couple the rear wheel support frame to the tractor frame such that the rear wheel support frame is rotatable in a clockwise and counterclockwise direction when viewed from the rearward end of the tractor frame.

16. The stand-on tractor of claim 15, wherein the crossmember extends through an opening in the tractor frame, the opening defining a stop to prevent over-rotation of the rear wheel support frame.

17. The stand-on tractor of claim 13, further comprising:

a forward frame pivotally connected to the tractor frame thereby defining a first axis of rotation, the forward frame being pivotable about the first axis of rotation from a use position to a withdrawn position; and a bracket extending from a foremost end of the forward frame, the work function being rotatably coupled to the bracket thereby defining a second axis of rotation, the work function being rotatable about the second axis of rotation from a use position to a service position;

wherein the second axis of rotation is substantially vertically aligned with a centerline of a rotating portion of the work function.

18. The stand-on tractor of claim 13, wherein the work function extends from and is rotatably coupled to the tractor frame forward end, the work function being at least partially supported by an auxiliary wheel and rotatable between a use position relatively near a ground surface and a service position generally perpendicular to the ground surface, wherein an axis of rotation of the work function relative to the tractor frame is substantially vertically aligned with a centerline of an operable portion of the work function when the work function is in the use position.

19. The stand-on tractor of claim 18, wherein the work function comprises a housing, the operable portion of the work function being removable from the housing when the work function is in the service position.

20. The stand-on tractor of claim 18, wherein the work function is hydraulically actuated.

21. The stand-on tractor of claim 18, wherein the work function is electrically actuated.

22. The stand-on tractor of claim 1, wherein the work function extends from and is rotatably coupled to the tractor frame forward end, the work function being at least partially supported by an auxiliary wheel and rotatable between a use position relatively near a ground surface and a service position generally perpendicular to the ground surface, wherein an axis of rotation of the work function relative to the tractor frame is substantially vertically aligned with a centerline of an operable portion of the work function when the work function is in the use position.

* * * * *